United States Patent [19]

Gowan, Jr. et al.

[11] Patent Number: 5,026,507

[45] Date of Patent: Jun. 25, 1991

[54] FLUORESCENT WHITENING AGENTS, PRODUCTS COMPRISING THE AGENT AND METHOD OF USE THEREOF

[75] Inventors: John W. Gowan, Jr., Washington, D.C.; David K. Lo, Silver Spring, Md.

[73] Assignee: Westvaco Corporation, New York, N.Y.

[21] Appl. No.: 347,260

[22] Filed: May 4, 1989

[51] Int. Cl.$^5$ .................... C09K 11/06; D21H 17/14; C08K 5/09; C08L 101/00
[52] U.S. Cl. .......................... 252/301.21; 252/301.16; 162/162; 106/137; 106/148; 106/493; 106/505; 524/17
[58] Field of Search ...................... 252/301.21, 301.16; 162/164.6, 166, 162; 562/458; 560/19, 302; 106/493, 505

[56] References Cited

U.S. PATENT DOCUMENTS

| | | | |
|---|---|---|---|
| 658,769 | 10/1900 | Erdmann | 560/19 |
| 2,515,320 | 11/1946 | Sokol | 562/433 |
| 3,076,024 | 1/1963 | Larsen | 260/490 |
| 3,238,203 | 3/1966 | Krapcho | 260/247.2 |
| 3,560,624 | 2/1971 | Rogers | 424/310 |
| 3,620,913 | 11/1971 | Parmerter | 162/175 |
| 3,758,561 | 9/1973 | Rogers | 562/458 |
| 3,907,880 | 9/1975 | Håkansson | 562/458 |
| 4,310,677 | 1/1982 | Reisenwebber | 560/22 |
| 4,481,186 | 11/1984 | Deckner . | |
| 4,539,385 | 9/1985 | Geist et al. . | |
| 4,582,922 | 4/1986 | Meier | 560/19 |
| 4,607,073 | 8/1986 | Sakashita et al. . | |
| 4,633,009 | 12/1986 | Lerner | 560/19 |
| 4,642,322 | 2/1987 | Wehner et al. . | |
| 4,696,999 | 9/1987 | Spies et al. . | |

FOREIGN PATENT DOCUMENTS

| | | |
|---|---|---|
| 245279 | 6/1963 | Australia . |
| 2313460 | 9/1973 | Fed. Rep. of Germany . |
| 2538149 | 3/1976 | Fed. Rep. of Germany . |
| 1363127 | 3/1962 | France . |
| 74788 | 7/1970 | German Democratic Rep. . |

OTHER PUBLICATIONS

Shimizu, H. and Takemura, N, "Mutanegenicity of Some Aniline Derivatives", in Orford, R. R., Cowell, J. W.

Jamieson, G. G., and Love, E. J., editors "Occupational Health in the Chemical Industry", pp. 497-506, Medichem Calgary 1983 Association, Calgary (1983).

"The Organic Chemistry of Color," *American Ink Maker*, Jan., 1950. Author: Schneid, pp. 28-57.

*Primary Examiner*—Prince E. Willis
*Assistant Examiner*—Thomas W. Steinberg

[57] ABSTRACT

A paper additive of high whiteness and low biological toxicity comprising a whitening amount of a compound of the formula

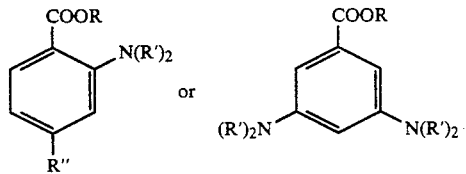

wherein R is H or $(C_1-C_6)$alkyl R' is independently H or $(C_1-C_6)$alkyl, R" is H or $NR'_n$, and n is 2 or 3, wherein if n=3 the compound further comprises $X^-$, wherein $X^-$ is an anion.

A paper of high whiteness and low biological toxicity is coated or filled with the above additive, and a food product is packaged with the paper of this invention.

13 Claims, No Drawings

FLUORESCENT WHITENING AGENTS, PRODUCTS COMPRISING THE AGENT AND METHOD OF USE THEREOF

This invention is related to co-pending U.S. application Ser. No. 401,427, filed on 8/31/89 entitled "Polyalkylene Imide of High Brightness and Retention Characteristics and Low Toxicity and Method of Increasing Paper Whiteness", U.S. application Ser. No. 347,328, now U.S. Pat. No. 4,954,566, filed on 5/4/89 entitled "Preparation of Polymers with Pendant Organic Moieties Bound thereto via Ester and/or Amide Bridges", U.S. application Ser. No. 426,866, filed on 10/26/89, entitled "Cellulosic Pulp of High Brightness and Retention Characteristics and Methods of Preparing Thereof", and U.S. application Ser. No. 401,624, now U.S. Pat. No. 4,963,625, filed on 8/31/89 entitled "Polyacrylamide Whitener of High Brightness and Retention and Low Toxicity and Method of Increasing paper Whiteness", and U.S. application Ser. No. 462,231 files on 1/9/90, entitled "Quaternary Ammonium Fluorescent Whitening Agents, Products thereof, Method of Preparing the Agent and Method of Using thereof", all by the present inventors and assignors.

TECHNICAL FIELD

This invention relates to the preparation of fluorescent acids and esters and their use as whitening agents, particularly in coating formulations which increase the whiteness of paper products. Given the low proven toxicity of the present agents they are particularly suited for the packaging of food products. The agents of the invention comprise a large number of derivatives of anthranilic acid including esters thereof and amino derivatives thereof.

BACKGROUND ART

The brightness of bleached paper products can be increased by adding fillers such as titanium dioxide and fluorescent whitening agent to the paper or coating the paper with such products. However, the use of fluorescent whitening agents is usually more economical, and is therefore progressively becoming more common than the use of titanium dioxide.

On the other hand, the use of known fluorescent whitening agents is not free from biological and environmental consequences. This becomes of particular importance when applied to the manufacture of paper products which are to be placed in contact with edibles such as foods and the like.

At the present time there are no known fluorescent whitening agents of low biological and environmental impact which are being used in the manufacture of paper products in the food industry in the United States.

Only one fluorescent whitening agent has, to the present time, been approved by the Food and Drug Administration (FDA) for use in food related applications. This agent is manufactured by Ciba-Geigy and sold as Uvitex OB. The product is highly insoluble in water and is marketed as a plastic additive (U.S. Pat. No. 4,642,322 to Wehner et al).

Anthranilic acid and various derivatives thereof have been known, as are known their low toxicity and high fluorescent characteristics.

U.S. Pat. No. 4,642,322 referred to above discloses the addition of anthranilic acid amide as a stabilizer to thermoplastics. Titanium dioxide is also utilized by this patent. However, the product is provided not as a coating formulation for use in paper products but as a thermoplastic for use in plastics.

Amino benzoic acids have been disclosed as being useful for the preparation of polybenzamide in the presence of metal halides. U.S. Pat. No. 4,696,999 discloses such products as well as amino benzoic acid esters for use in the synthesis of polybenzamides. The amino benzoic acids and esters thereof described in this patent are, however, meta- and para-amino compound, and are therefore positional isomers of the esters and acids of this invention. In addition, this patent proposes the use of these compounds to form pulps of short fiber materials with high stability values. This patent also discloses in Example A a condensation reaction of 4-aminobenzoic acids with titanium chloride but nowhere is there a disclosure of use of the compounds in paper products.

U.S. Pat. No. 4,481,186 to Speakman describes a copolymer pigment dispersant suitable for use in the preparation of paints and para-aminobenzoic acid is one of the components utilized. Another component is titanium dioxide which is used as a pigment for color. No mention of any utility in terms of the utilization of the products for coating paper is stated.

Aminobenzoic acid is also used in admixture with a coloring agent such as titanium dioxide for the preparation of cosmetic and skin treatment composition in U.S. Pat. No. 4,481,186. The prior art cosmetic and skin treatment compositions are generally speaking coating formulations but they are not paper whitening coating compositions.

A condensate of para- or meta-aminobenzoic acid and titanium dioxide is disclosed in U.S. Pat. No. 4,607,703. These materials are incorporated into molding polyamide compositions but are not suggested for use in paper coatings.

Titanium dioxide is used as a pigment and 4-aminobenzoic acid as a compound capable of providing an activated ester group in the preparation of self cross-linking heat-curable grinding resins in U.S. Pat. No. 4,539,385. No mention of paper coatings in this patent can be found.

Fluorescent whitening agents work by emitting bluish light upon excitation in the long ultra violet region (about 350–400 nm). This light can compensate for the yellowness inherent to paper products.

For example, methyl anthranilate and methyl N-methyl anthranilate have been reported to be non-mutagenic in short-term microbial assays (Shimizu, H. and Takemura, N., "Mutangenicity of Some Aniline Derivatives", in Orford, R.R., Cowell, J.W., Jamieson, G.G., and Love, E.J., editors, "Occupational Health in the Chemical Industry", pp 497–506, MEDICHEM Calgary 1983 Association, Calgary (1983)).

There is thus a real need for a low toxicity, low cost whitening agent suitable as a paper additive for use in packaging intended for use in the food industry.

DISCLOSURE OF THE INVENTION

This invention relates to a paper additive of high whiteness, comprising
a whitening amount of a compound of the formula

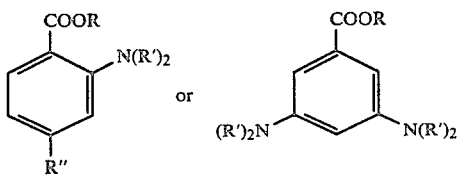

wherein
R is H, or (C$_1$–C$_6$)alkyl;
R' is H or (C$_1$–C$_6$)alkyl;
R" is H or NR n; and
n is 2 or 3, wherein if n=3 the molecule further comprises X$^-$, wherein X$^-$ is an anion.

Also part of this invention is a paper of high whiteness and low contact toxicity which is coated with a coating comprising the above additive.

Still part of this invention is a food product packaged with the above high whiteness, low biological toxicity paper.

A method of increasing the whiteness of a paper while preserving its low biological toxicity is also provided herein which comprises coating said paper with a composition comprising the above additive.

This invention also relates to a paper filler of high whiteness and low toxicity which comprises a whitening by-filling amount of the paper additive of this invention.

Also provided herein is a paper of high whiteness and low biological toxicity which comprises a whitening amount of the paper additive described above.

Also part of this invention is a method of increasing the whiteness of a paper while preserving its low biological toxicity which comprising admixing to the paper ingredients a whitening amount of the paper additive of this invention.

Still part of this invention is a food product wrapped with the above high whiteness, low biological toxicity paper.

A more complete appreciation of the invention and many of the attendant advantages thereof will be readily perceived as the same becomes better understood by reference to the following detailed description. Other objects, advantages and features of the present invention will thus become apparent to those skilled in the art from the following discussion.

BEST MODE FOR CARRYING OUT THE INVENTION

This invention arose from a desire to improve the production of papers which are suitable for use in packaging of food products. In many instances, whiteners are desirable to use either in a mixture with the components of a paper or as part of a coating applied to the final paper product. However, up to the present time there had been no biologically safe fluorescent whiteners applied to the production of paper or paper coatings intended for use in the food industry.

This invention for the first time provides an additive of high whiteness and low biological toxicity suitable for use in paper coatings.

The paper additive provided herein comprises a compound of the formula

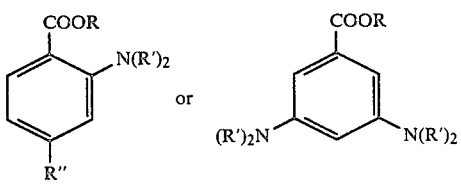

wherein
R is H, or (C$_1$–C$_6$)alkyl;
R' is H, or (C$_1$–C$_6$)alkyl;
R" is H or NR'n; and
n is 2 or 3; wherein if n=3 the compound further comprises X$^-$, wherein X$^-$ is an anion.

In a particular embodiment, the invention comprises a coating composition comprising a whitening-by-coating amount of the above compound, optionally also comprising other pigments and/or known additives. By means of example the additive may comprise about 0.5 to 1.5 wt% of the coating composition However, other amounts are possible as well. Binders and additives suitable for use with the present additive are known in the art. Whiteners other than the present ones which may be incorporated in the coating composition are also known in the art. A particularly suitable whitener is titanium dioxide. When titanium dioxide is added to the coating composition of the invention a higher whiteness and/or brightness is attained. Alternatively, the titanium dioxide may be added to the paper ingredients and the present additive coated onto the finished paper product. The coated paper product may then be subjected to a printing process if desired.

In another particularly preferred embodiment of this invention, the paper additive of the invention is one wherein the compound is selected from the group consisting of

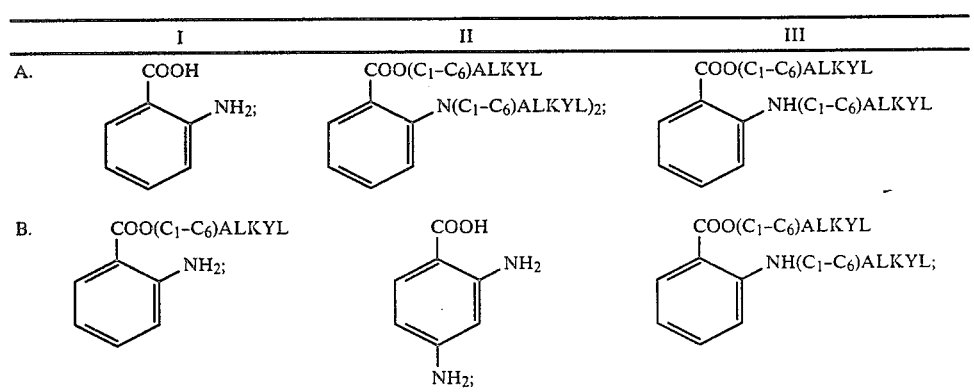

-continued

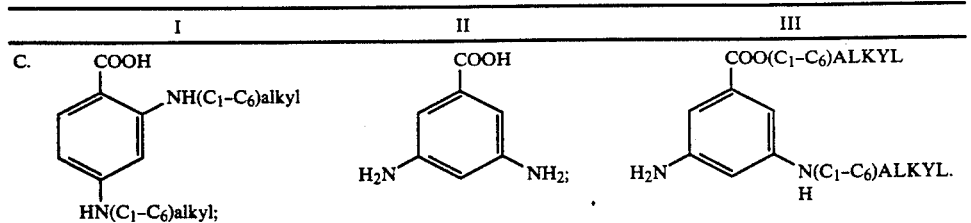

In still another preferred embodiment the paper additive described herein is one wherein the compound is selected from the group consisting of

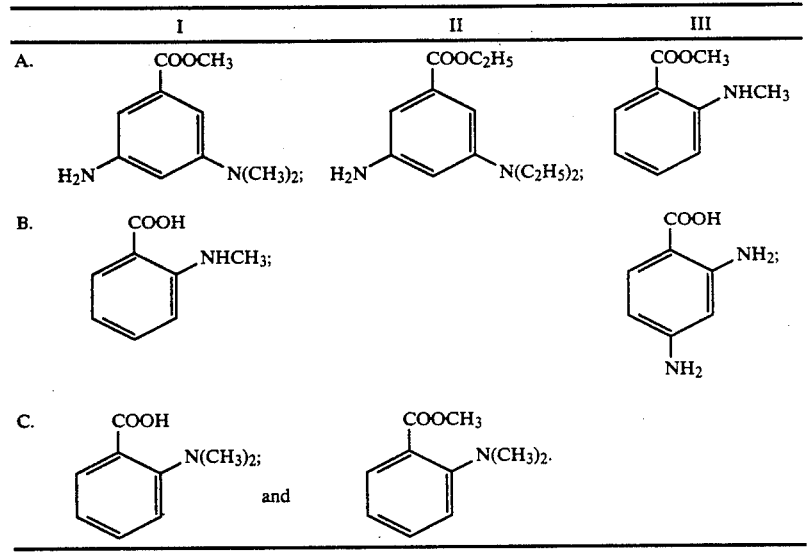

A still more-preferred compound is methyl N-methylanthranilate.

When the paper coating of the invention contains other whitening components in addition to the anthranilic acid derivative, the anthranilic acid is contained therein in an at least whitening-by-coating amount, but this amount may be lower than if contained in the absence of other whitening agents.

This invention also provides a paper of high whiteness and low biological toxicity which is coated with the additive of the invention. A variety of paper types may be utilized herein. Specific examples are cellulose and derivatives thereof, mixtures of cellulose and synthetic polymers and the like. However, other types of papers may also be utilized.

Also provided herein is a food product which is packaged with the high whiteness, low biological toxicity paper of the invention. Almost any food product is encompassed by this invention. Examples thereof are both dry and moist food products. However, other foodstuffs are also encompassed within the confines of this invention.

Also provided herein is a method of increasing the whiteness of a paper while preserving its low biological toxicity, which comprises
  coating the paper with a coating composition comprising a compound of the formula

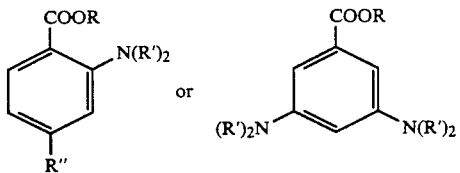

wherein
R is H, or ($C_1$–$C_6$) alkyl
R' is H, or ($C_1$–$C_6$) alkyl
R" is H or NR'$_n$; and
n is 2 or 3; wherein if n=3 the molecule further comprises X$^-$, wherein X$^-$ is an anion The above method may be practiced by utilizing particularly preferred compounds of the invention such as those selected from the group consisting of

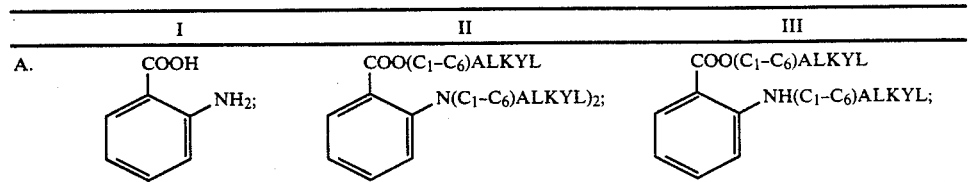

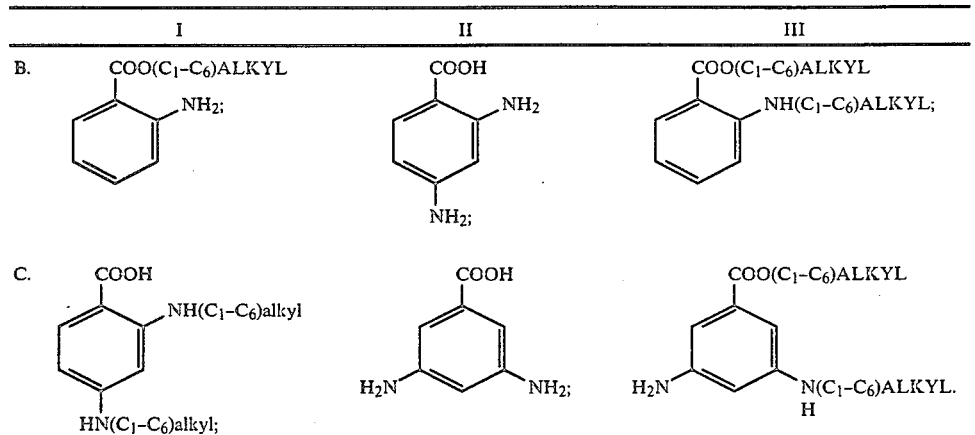

In still a more preferred embodiment of the method described above the compound is selected from the group consisting of

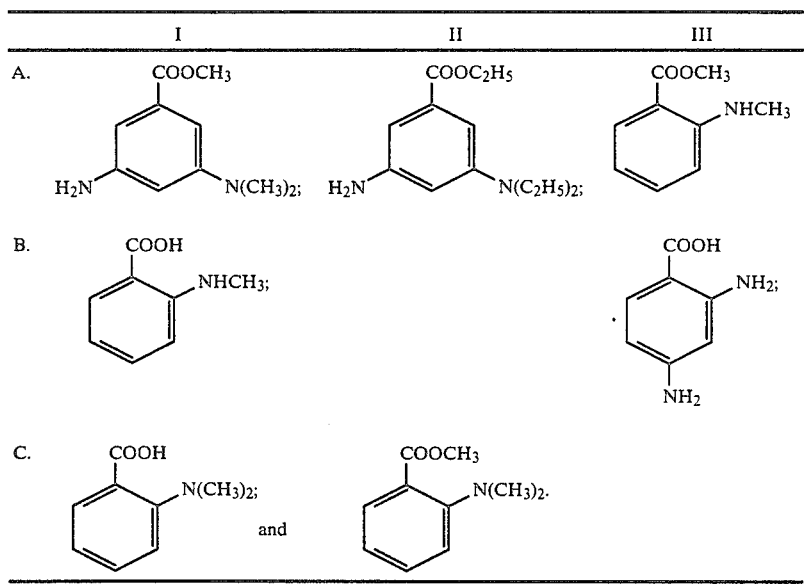

A most preferred compound is methyl N-methylanthranilate.

The application of the coating composition to a paper may be conducted in a variety of manners generally known in the art. Examples thereof are by spraying, scraping or roll coating and the like. Other methods may also be utilized herein.

Also part of this invention is a paper filler of high whiteness and low biological toxicity, which comprises the paper additive of the invention.

In a particular embodiment thereof the paper filler comprises a whitening-by-filling amount of the paper additive, and optionally pigments or other whiteners and/or other additives. The comments made above with regard to the binders, pigments or other whiteners and additives also apply to this case.

Also provided herein is a paper of high whiteness and low biological toxicity which comprises a whitening-by-filling amount of the compound of the formula

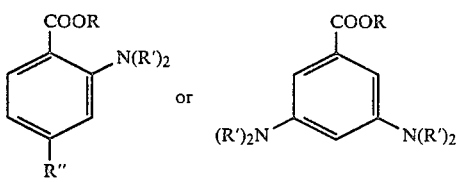

wherein
R is H, or $(C_1-C_6)$alkyl;
R' is H, or $(C_1-C_6)$alkyl;
R'' is H or $NR'_n$; and
n is 2 or 3; wherein if n=3 the molecule further comprises $X^-$, wherein $X^-$ is an anion.

Also part of this invention is a method of increasing the whiteness of a paper while preserving its low biological toxicity, comprising
admixing to the paper ingredients a whitening amount of the compound of the formula

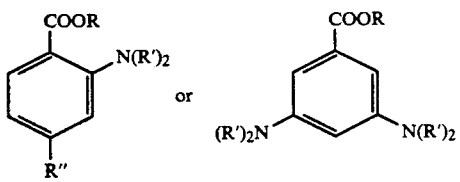

wherein
R is H, or $(C_1-C_6)$alkyl;
R' is H, or $(C_1-C_6)$alkyl;
R' is H or $NR'_n$; and
n is 2 or 3; wherein if n=3 the molecule further comprises X−, wherein X− is an anion.

The method of increasing the whiteness of a paper by admixing to the paper ingredients a whitening amount of the compound of the invention may be conducted in a variety of manners known in the art. The whitener of the invention may be added to one ingredient and then the remaining ingredients admixed thereto or the ingredients may be placed together and then the whitener added thereto.

Also part of this invention is a food product which is packaged with the high whiteness, low biological toxicity paper comprising a whitening-by-filling amount of the present whitener.

The compounds of this invention may be prepared by methods known in the art. Particularly useful methods are those described by, e.g., U.S. Pat. Nos. 4,582,922 and 4,633,009.

Having now generally described this invention, the same will be better understood by reference to certain specific examples, which are included herein for purposes of illustration only and are not intended to be limiting of the invention or any embodiment thereof, unless so specified.

EXAMPLES

EXAMPLE 1

Methyl N-methyl anthranilate (R=R'=CH$_3$)'s used as a coating whitener for a paper board.

Methyl N-methyl anthranilate (R=R'=CH$_3$) was incorporated at a level of 0.5 wt% and 1.5 wt% into a coating composition also containing 42.2 wt% clay, 8.3 wt% synthetic binder, 5.2 wt% plastic pigment, 0.43 wt% protein, 0.16 wt% dispersant and 0.74 wt% lubricant. The composition was coated onto a paper boards and allowed to dry. Several samples were prepared and the brightness of all coated boards measured. The results are shown in the Table 1 below.

TABLE 1

Effect of Methyl-N-Methyl Anthranilate (MNMA) On Brightness of Bleached Boards

| MNMA Concentration Base Coat (wt %) | Top Coat (wt %) | GE Brightness[1] | Brightness Gain |
|---|---|---|---|
| 0 | 0 | 80.2 ± 0.2 | — |
| 0 | 0.5 | 81.5 ± 0.0 | 1.3 |
| 0 | 1.5 | 82.1 ± 0.1 | 1.9 |
| 0.5 | 0.5 | 81.1 ± 0.1 | 1.9 |
| 0.5 | 1.5 | 81.6 ± 0.2 | 1.4 |
| 1.5 | 0.5 | 81.2 ± 0.2 | 1.0 |
| 1.5 | 1.5 | 81.9 ± 0.1 | 1.7 |

MNMA = Methyl N-methyl anthranilate on coating solids
[1] the number of samples per example is 3.

The data shown in able 1 were obtained by drawn downs with a target of 5 and 7 lbs/3000 sq. ft. for base and top coat, respectively.

EXAMPLE 2

Methyl N-Methyl anthranilate (R=R'=CH$_3$) was incorporated at a level of 1.5 wt% into a coating composition also containing 29.4 wt% calcium carbonate, 16.7 wt% clay, 4.8 wt% plastic pigment, 6.4 wt% titanium dioxide, 7.9 wt% synthetic binder, 0.32 wt% polyvinyl alcohol, 0.32 wt% carboxymethyl cellulose, 0.25 wt% dispersant and 0.02 wt% defoamer.

The composition was coated onto a base-coated bleached paper board and allowed to dry. SEveral samples were prepared and the brightness of all coated boards measured The results are shown in Table 2 below.

TABLE 2

Effect of Methyl N-Methyl Anthranilate (MNMA) on Brightness of a Titanium Dioxide-containing Coating

| MNMA Concentration (wt %) | G.E. Brightness | Brightness Gain |
|---|---|---|
| 0 | 82.6 ± 0.2 | — |
| 1.5 | 84.2 ± 0.1 | 0.6 |

The data contained in Table 2 were obtained by draw downs with a target of 6 lbs/3000 sq. ft.

Example 3

Methyl N-methyl anthranilate (R=R'=CH$_3$) was incorporated at a level of 0.5 wt% and 1.5% into a coating composition also containing 42.6 wt% clay, 5.9 wt% calcined clay, 7.3 wt% synthetic binder, 4.4 wt% plastic pigment, 0.22 wt% dispersant, and 0.15 wt% lubricants.

The composition was coated onto a base coated bleached paper board and allowed to dry. Several samples were prepared and the brightness of all coated boards measured. The results are shown in Table 3 below.

TABLE 3

Effect of Methyl N-Methyl Anthranilate (MNMA) on Brightness of Base Coated Bleached Paper Board

| MNMA Concentration (wt %) | G.E. Brightness | Brightness Gain |
|---|---|---|
| 0 | 79.9 ± 0.1 | — |
| 0.5 | 80.8 ± 0.0 | 0.9 |
| 1.5 | 81.2 ± 0.1 | 1.3 |

The data contained in Table 3 were obtained by drawn downs with a target of 6 lbs/3000 sq. ft.

From the data contained in the Tables 1-3 it can be seen that methyl-N-methyl anthranilate (MNMA) increases the brightness of coated paper boards by over one unit when coated in the absence of titanium dioxide and over 0.5 unit when applied as a coating also containing titanium dioxide.

The invention now being fully described, it will be apparent to one of ordinary skill in the art that many changes and modifications can be made thereto without departing from the spirit or scope of the invention as set forth herein.

We claim:

1. A fluorescent paper coating composition of high whiteness and low biological toxicity, comprising as an additive
a fluorescent whitening-by-coating amount of a compound of the formula

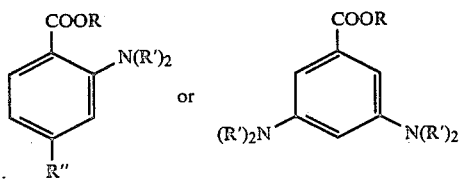

wherein
R is H or ($C_1$-$C_6$) alkyl,
R' is independently H or ($C_1$-$C_6$) alkyl;;

R" is H or $NR'_n$, and
n is 2 or 3; wherein if n=3 the compound further comprises $X^-$, wherein $X^-$ is an anion,
and a filler or dispersant; and
wherein said composition may further optionally comprise a lubricant.

2. A fluorescent coating composition according to claim 1, wherein said fluorescent whitening-by-coating additive comprises from about 0.5 to 1.5 wt% of the coating composition.

3. A composition according to claim 2, further comprising other pigments, binders or additives.

4. A composition according to claim 1 which further comprises a whitener other than said fluorescent whitening-bycoating additive.

5. A paper coating composition according to claim 1, wherein said fluorescent coating additive is selected from the group consisting of

|   | I | II | III |
|---|---|----|-----|
| A. | COOH, $NH_2$ (ortho) | COO($C_1$-$C_6$)ALKYL, N($C_1$-$C_6$)ALKYL)$_2$ (ortho) | COO($C_1$-$C_6$)ALKYL, NH($C_1$-$C_6$)ALKYL (ortho) |
| B. | COO($C_1$-$C_6$)ALKYL, $NH_2$ (ortho) | COOH, $NH_2$ (ortho), $NH_2$ (para) | COO($C_1$-$C_6$)ALKYL, NH($C_1$-$C_6$)ALKYL (ortho) |
| C. | COOH, NH($C_1$-$C_6$)alkyl (ortho), HN($C_1$-$C_6$)alkyl (para) | COOH, $H_2N$, $NH_2$ (3,5) | COO($C_1$-$C_6$)ALKYL, $H_2N$, N($C_1$-$C_6$)ALKYL, H (3,5) |

6. A fluorescent paper coating composition according to claim 1, wherein said fluorescent coating additive is selected from the group consisting of

|   | I | II | III |
|---|---|----|-----|
| A. | $COOCH_3$, $H_2N$, N($CH_3$)$_2$ (3,5) | $COOC_2H_5$, $H_2N$, N($C_2H_5$)$_2$ (3,5) | $COOCH_3$, $NHCH_3$ (ortho) |
| B. | COOH, $NHCH_3$ (ortho) |  | COOH, $NH_2$ (ortho), $NH_2$ (para) |
| C. | COOH, N($CH_3$)$_2$ (ortho) and |  | $COOCH_3$, N($CH_3$)$_2$ (ortho). |

7. A fluorescent paper coating composition according to claim 1, wherein the additive is methyl N-methyl anthranilate.

8. A fluorescent paper filler composition of high whiteness and low biological toxicity, comprising as an additive
a fluorescent whitening-by-filling amount of a compound of the formula

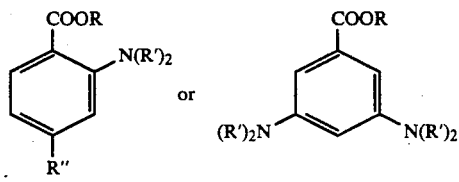

wherein

R is H or ($C_1$-$C_6$) alkyl,
R' is independently H or ($C_1$-$C_6$) alkyl;
R" is H or $NR'_n$, and n is 2 or 3; wherein if n=3 the compound further comprises $X^-$, wherein $X^-$ is an anion; and
a paper filler or filler carrier.

9. A fluorescent paper filler composition according to claim 8, further comprising other pigments, binders or additives.

10. A fluorescent paper filler composition according to claim 8, which further comprises a whitener other than said fluorescent whitening-by-filling additive.

11. A paper filler composition according to claim 8, wherein said fluorescent paper additive is selected from the group consisting of

|   | I | II | III |
|---|---|---|---|
| A. | ![COOH, NH2 benzene] | ![COO($C_1$-$C_6$)ALKYL, N($C_1$-$C_6$)ALKYL)2] | ![COO($C_1$-$C_6$)ALKYL, NH($C_1$-$C_6$)ALKYL] |
| B. | ![COO($C_1$-$C_6$)ALKYL, NH2] | ![COOH, NH2, NH2] | ![COO($C_1$-$C_6$)ALKYL, NH($C_1$-$C_6$)ALKYL] |
| C. | ![COOH, NH($C_1$-$C_6$)alkyl, HN($C_1$-$C_6$)alkyl] | ![COOH, H2N, NH2] | ![COO($C_1$-$C_6$)ALKYL, H2N, N($C_1$-$C_6$)ALKYL.H] |

12. A fluorescent paper filler composition according to claim 8, wherein said fluorescent paper additive is selected from the group consisting of

|   | I | II | III |
|---|---|---|---|
| A. | ![COOCH3, H2N, N(CH3)2] | ![COOC2H5, H2N, N(C2H5)2] | ![COOCH3, NHCH3] |
| B. | ![COOH, NHCH3] |   | ![COOH, NH2, NH2] |
| C. | ![COOH, N(CH3)2]; and | ![COOCH3, N(CH3)2] |   |

13. A fluorescent paper filler composition according to claim 8, wherein the additive is methyl N-methyl anthranilate.

* * * * *